(12) United States Patent
Marcus et al.

(10) Patent No.: US 8,346,898 B2
(45) Date of Patent: Jan. 1, 2013

(54) AUTOMATED RELATIONSHIP CLASSIFICATION

(75) Inventors: Jane B. Marcus, Westford, MA (US); Richard Blair Davies, Jr., Wayland, MA (US); A. Julie Kadashevich, Tyngsboro, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/648,442

(22) Filed: Dec. 29, 2009

(65) Prior Publication Data

US 2011/0161429 A1 Jun. 30, 2011

(51) Int. Cl.
*G06F 15/16* (2006.01)
(52) U.S. Cl. .......................... 709/220; 709/203; 709/224
(58) Field of Classification Search .................. 709/201, 709/220, 224; 707/3, 10
See application file for complete search history.

(56) References Cited

U.S. PATENT DOCUMENTS

| | | | |
|---|---|---|---|
| 6,865,268 B1 | 3/2005 | Matthews et al. | |
| 7,024,474 B2 * | 4/2006 | Clubb et al. | 709/223 |
| 7,069,259 B2 | 6/2006 | Horvitz et al. | |
| 7,167,910 B2 | 1/2007 | Farnham et al. | |
| 7,454,464 B2 | 11/2008 | Puthenkulam et al. | |
| 2005/0010509 A1 | 1/2005 | Straub | |
| 2006/0031772 A1 | 2/2006 | Valeski | |
| 2006/0184667 A1 * | 8/2006 | Clubb et al. | 709/224 |
| 2006/0218153 A1 * | 9/2006 | Voon et al. | 707/10 |
| 2006/0218225 A1 * | 9/2006 | Hee Voon et al. | 709/201 |
| 2008/0163075 A1 * | 7/2008 | Beck et al. | 715/759 |
| 2009/0031232 A1 * | 1/2009 | Brezina et al. | 715/764 |
| 2009/0070700 A1 | 3/2009 | Johanson | |
| 2009/0100469 A1 * | 4/2009 | Conradt et al. | 725/46 |
| 2009/0138460 A1 * | 5/2009 | Gorti et al. | 707/5 |
| 2009/0177744 A1 * | 7/2009 | Marlow et al. | 709/204 |
| 2009/0299963 A1 * | 12/2009 | Pippuri | 707/3 |
| 2010/0280965 A1 * | 11/2010 | Vesterinen et al. | 705/319 |

OTHER PUBLICATIONS

"http://searchcrm.techtarget.com/definition/CRM," Downlaoded Jul. 30, 2012, pp. 1-22.
Rowe et al., "Automated Social Hierarchy Detection Through Email Network Analysis," Joint 9th WEBKDD and 1st SNA-KDD Workshop '07, Aug. 12, 2007, San Jose, California, USA, pp. 1-9.

* cited by examiner

*Primary Examiner* — Khanh Dinh
(74) *Attorney, Agent, or Firm* — Holland & Knight LLP; Brian J. Colandreo, Esq.; Jeffrey T. Placker, Esq.

(57) ABSTRACT

A method and computer program product for automatically classifying relationships in a social networking or email application is described. A method may comprise associating, via at least one of a client electronic device and a server computer, a first incoming communication type and a first outgoing communication type with a first contact group, and a second incoming communication type and a second outgoing communication type with a second contact group. The method may further comprise monitoring, via at least one of the client electronic device and the server computer, an incoming communication from a contact and an outgoing communication to the contact.

20 Claims, 5 Drawing Sheets

AUTOMATED RELATIONSHIP CLASSIFICATION

BACKGROUND OF THE INVENTION

This disclosure relates to social networking and email applications and, more particularly, to methodologies for automated relationship classification in social networking and email applications.

Social networking and email applications may allow users to manage relationships with contacts. Users may have professional relationships, friendships, and other relationships with contacts, and may classify these relationships manually. Users may wish to allow contacts to view personal information based upon the type of relationship they have with each contact.

Manually classifying relationships with new contacts and changing relationships with existing contacts may be time-consuming for users. Also, users may want to change the type of personal information an existing contact can view as their relationship with that contact changes. Accordingly, users may need an automated relationship classification system which may classify their relationships with contacts in social networks and email applications.

BRIEF SUMMARY OF THE INVENTION

In a first embodiment, a method may comprise associating, via at least one of a client electronic device and a server computer, a first incoming communication type and a first outgoing communication type with a first contact group, and a second incoming communication type and a second outgoing communication type with a second contact group, in at least one of a social networking application and an email application. The method may further comprise monitoring, via at least one of the client electronic device and the server computer, an incoming communication from a contact and an outgoing communication to the contact. The method may also comprise designating, via at least one of the client electronic device and the server computer, the incoming communication as at least one of the first incoming communication type and the second incoming communication type and the outgoing communication as at least one of the first outgoing communication type and the second outgoing communication type. Additionally, the method may comprise placing, via at least one of the client electronic device and the server computer, the contact into at least one of the first contact group and the second contact group based upon, at least in part, the designated incoming communication type and the designated outgoing communication type.

One or more of the following features may be included. The method may further comprise defining the first contact group and the second contact group in at least one of the social networking application and the email application. The first contact group may have a first access permission scheme, the second contact group may have a second access permission scheme, and a third contact group may have a third access permission scheme. The first incoming communication type, first outgoing communication type, second incoming communication type, and second outgoing communication type may be at least one of a personal message, a wall message, a chat, a virtual poke, an e-card, a virtual gift, and a photo tag. The method may also comprise defining the first access permission scheme for the first contact group, the second access permission scheme for the second contact group, and the third access permission scheme for the third contact group. Additionally, the method may comprise requiring a user's permission before placing the contact into at least one of the first contact group and the second contact group.

In some implementations, the method may comprise monitoring communication types of, at least one of, a plurality of outgoing communications to at least one contact, and a plurality of incoming communications from the at least one contact, and which contact group a user places the at least one contact into. Furthermore, the method may comprise extrapolating a default model for the user based upon, at least in part, the communication types and which contact group the user placed the at least one contact into. The method may additionally comprise placing a new contact into one of the contact groups based upon, at least in part, the default model. Placing the contact into at least one of the first contact group and the second contact group may be scheduled by a user.

In another implementation, the method may comprise monitoring communication types of at least one of incoming communications and outgoing communications for a plurality of users, and contact group placement by each of the plurality of users. The method may further comprise extrapolating a default model based upon, at least in part, the communication types and the contact group placements by each of the plurality of users. The method may also comprise placing contacts into contact groups based upon, at least in part, the default model. Placing contacts into contact groups based upon, at least in part, the default model may be scheduled by a user In another embodiment, a computer program product may reside on a computer readable storage medium and may have a plurality of instructions stored on it. When executed by a processor, the instructions may cause the processor to perform operations comprising associating, via at least one of a client electronic device and a server computer, a first incoming communication type and a first outgoing communication type with a first contact group, and a second incoming communication type and a second outgoing communication type with a second contact group, in at least one of a social networking application and an email application. The operations may further comprise monitoring, via at least one of the client electronic device and the server computer, an incoming communication from a contact and an outgoing communication to the contact. The operations may also comprise designating, via at least one of the client electronic device and the server computer, the incoming communication as at least one of the first incoming communication type and the second incoming communication type and the outgoing communication as at least one of the first outgoing communication type and the second outgoing communication type. The operations may additionally comprise placing, via at least one of the client electronic device and the server computer, the contact into at least one of the first contact group and the second contact group based upon, at least in part, the designated incoming communication type and the designated outgoing communication type.

One or more of the following features may be included. The operations may further comprise defining the first contact group and the second contact group in at least one of the social networking application and the email application. The first contact group may have a first access permission scheme, the second contact group may have a second access permission scheme, and a third contact group may have a third access permission scheme. The first incoming communication type, first outgoing communication type, second incoming communication type, and second outgoing communication type may be at least one of a personal message, a wall message, a chat, a virtual poke, an e-card, a virtual gift, and a photo tag. The operations may also comprise defining the first access permission scheme for the first contact group, the second access permission scheme for the second contact group, and the third access permission scheme for the third contact group. Additionally, the operations may comprise requiring a user's permission before placing the contact into at least one of the first contact group and the second contact group.

In some implementations, the operations may comprise monitoring communication types of, at least one of, a plurality of outgoing communications to at least one contact, and a plurality of incoming communications from the at least one contact, and which contact group a user places the at least one contact into. Furthermore, the operations may comprise extrapolating a default model for the user based upon, at least in part, the communication types and which contact group the user placed the at least one contact into. The operations may additionally comprise placing a new contact into one of the contact groups based upon, at least in part, the default model. Placing the contact into at least one of the first contact group and the second contact group may be scheduled by a user.

In another implementation, the operations may comprise monitoring communication types of at least one of incoming communications and outgoing communications for a plurality of users, and contact group placement by each of the plurality of users. The operations may further comprise extrapolating a default model based upon, at least in part, the communication types and the contact group placements by each of the plurality of users. The operations may also comprise placing contacts into contact groups based upon, at least in part, the default model. Placing contacts into contact groups based upon, at least in part, the default model may be scheduled by a user The details of one or more implementations are set forth in the accompanying drawings and the description below. Other features and advantages will become apparent from the description, the drawings, and the claims.

DETAILED DESCRIPTION OF THE INVENTION

Figure 1:
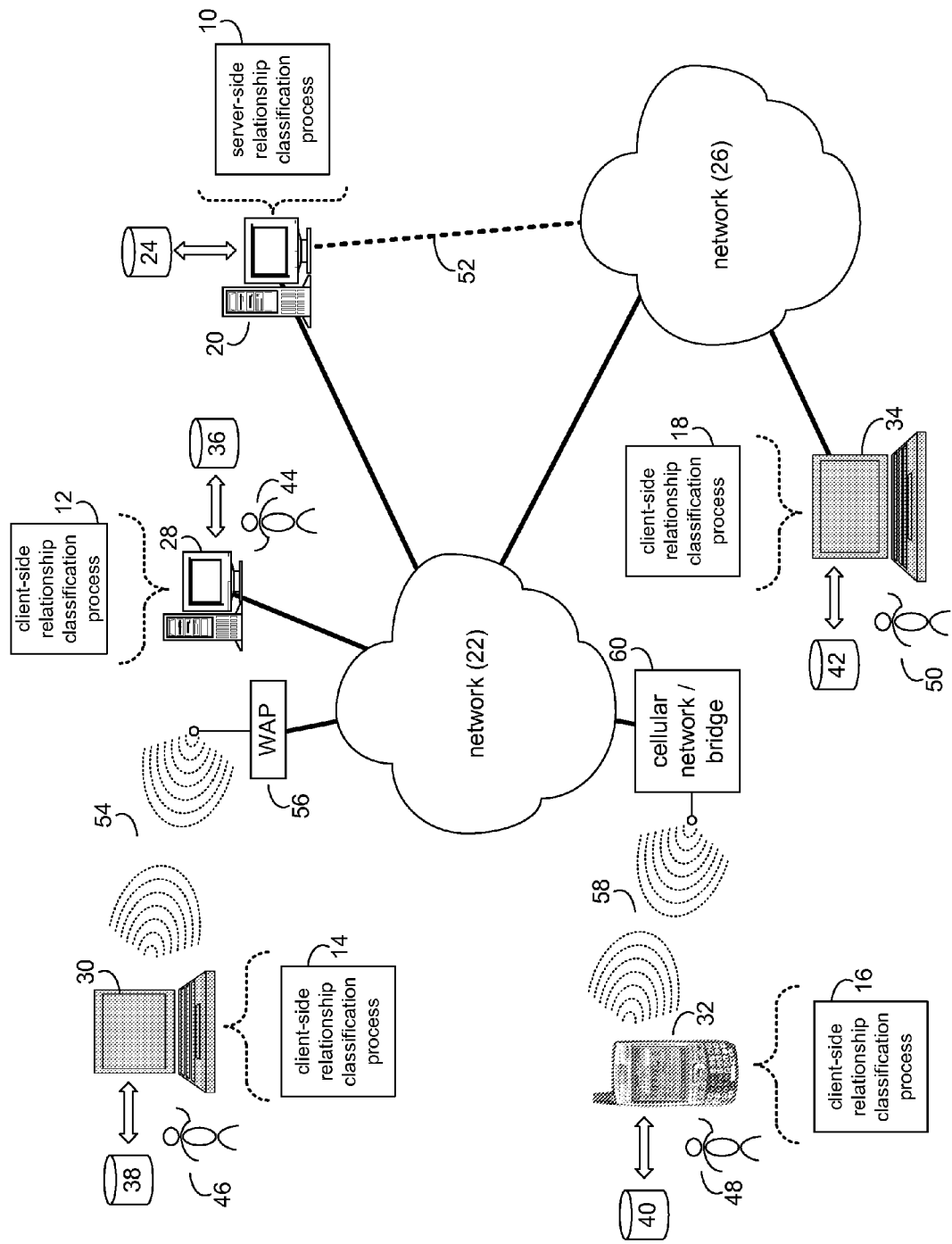
FIG. 1 is a diagrammatic view of a relationship classification process coupled to a distributed computing network.
Figure 2:
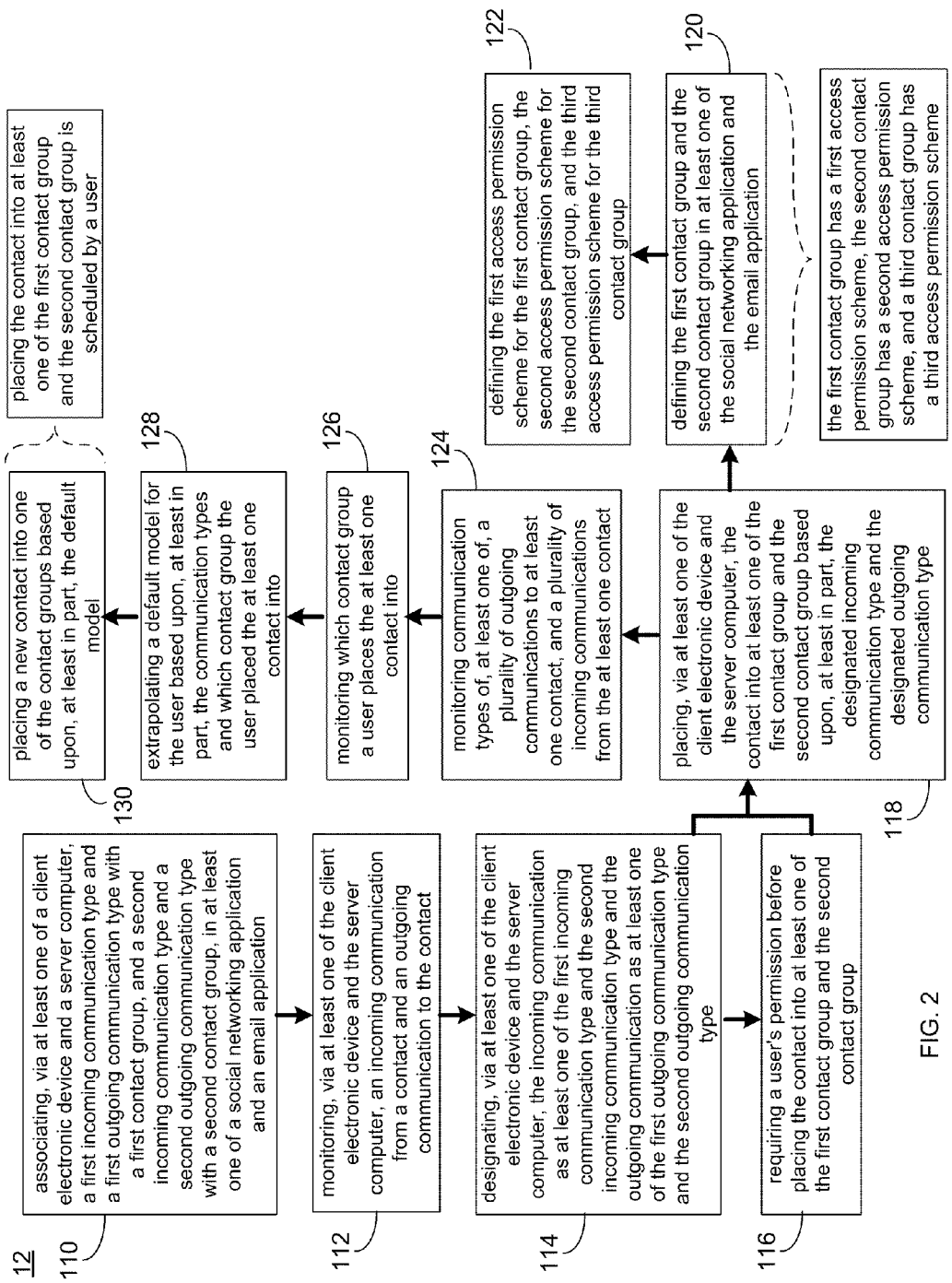
FIG. 2 is a flowchart of the relationship classification process of FIG. 1.

Referring to FIGS. 1 & 2, there is shown a relationship classification process 12. As will be discussed below, relationship classification process 12 may associate 110, via at least one of a client electronic device and a server computer, a first incoming communication type and a first outgoing communication type with a first contact group, and a second incoming communication type and a second outgoing communication type with a second contact group, in at least one of a social networking application and an email application. An incoming communication from a contact and an outgoing communication to the contact may be monitored 112 via at least one of the client electronic device and the server computer.

The relationship classification (RC) process may be a server-side process (e.g., server-side RC process 10), a client-side process (e.g., client-side RC process 12, client-side RC process 14, client-side RC process 16, or client-side RC process 18), or a hybrid server-side/client-side process (e.g., the combination of server-side RC process 10 and one or more of client-side RC processes 12, 14, 16, 18).

Server-side RC process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft Windows XP Server ™; Novell Netware ™; or Redhat Linux ™, for example.

The instruction sets and subroutines of server-side RC process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft IIS ™, Novell Webserver ™, or Apache Webserver ™, that allows for access to server computer 20 (via network 22) using one or more protocols, examples of which may include but are not limited to HTTP (i.e., HyperText Transfer Protocol), SIP (i.e., session initiation protocol), and the Lotus Sametime ™ VP protocol. Network 22 may be connected to one or more secondary networks (e.g., network 26), examples of which may include but are not limited to: a local area network; a wide area network; or an intranet, for example.

Client-side RC processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft Windows ™, Microsoft Windows CE ™, Redhat Linux ™, or a custom operating system.

The instruction sets and subroutines of client-side RC processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Client-side RC processes 12, 14, 16, 18 and/or server-side RC process 10 may be processes that run within (i.e., are part of) a social networking application or an email application. Alternatively, client-side RC processes 12, 14, 16, 18 and/or server-side RC process 10 may be stand-alone applications that work in conjunction with a social networking application and/or an email application. Examples of social networking applications may be, for example, Facebook ™, MySpace ™ and/or Beehive ™. Examples of email applications may be, for example, Gmail ™, Outlook ™, and/or Lotus Notes Mail ™. One or more of client-side RC processes 12, 14, 16, 18 and server-side RC process 10 may interface with each other (via network 22 and/or network 26) to allow a plurality of users (e.g., users 44, 46, 48, 50) to share information.

Users 44, 46, 48, 50 may access server-side RC process 10 directly through the device on which the client-side RC process (e.g., client-side RC processes 12, 14, 16, 18) is executed, namely client electronic devices 28, 30, 32, 34, for example. Users 44, 46, 48, 50 may access server-side RC process 10 directly through network 22 and/or through secondary network 26. Further, server computer 20 (i.e., the computer that executes server-side RC process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The RC Process

The RC process may move contacts into or out of established groups (e.g.

"good friends", "work colleagues", "other acquaintances") that may typically exist for the purpose of managing permissions to view the user's data or personal information. For the following discussion, client-side RC process 12 will be described for illustrative purposes. Client-side RC process 12 may be incorporated into server-side RC process 10 and may be executed within one or more social networking applications and/or email applications that allows for communication with client-side RC process 12. However, this is not intended to be a limitation of this disclosure, as other configurations are possible (e.g., stand-alone, client-side RC processes and/or stand-alone server-side RC processes.) For example, some implementations may include one or more of client-side RC processes 14, 16, 18 in place of or in addition to client-side RC process 12.

Referring now to FIGS. 1-5, client-side RC process 12 may associate 110, via at least one of a client electronic device (e.g., client electronic devices 28, 30, 32, 34) and a server computer (e.g., server computer 20), a first incoming communication type (e.g., incoming communication types 202) and a first outgoing communication type (e.g., outgoing communication types 204) with first contact group 206. It may further associate second incoming communication type (e.g., incoming communication types 202) and a second outgoing communication type (e.g., outgoing communication types 204) with second contact group 208. While client-side RC process 12 and/or server-side RC process 10 may be used in either a social networking application and/or an email application, a social networking application will be described below for illustrative purposes. Incoming communication types 202 and outgoing communication types 204 may include, but are not limited to, personal messages, wall messages, chat, virtual pokes, e-cards, virtual gifts, and photo tags, and may be types of communications users can exchange over a social network. Some of these communication types may also be exchanged over email (i.e., personal messages).

Figure 4:
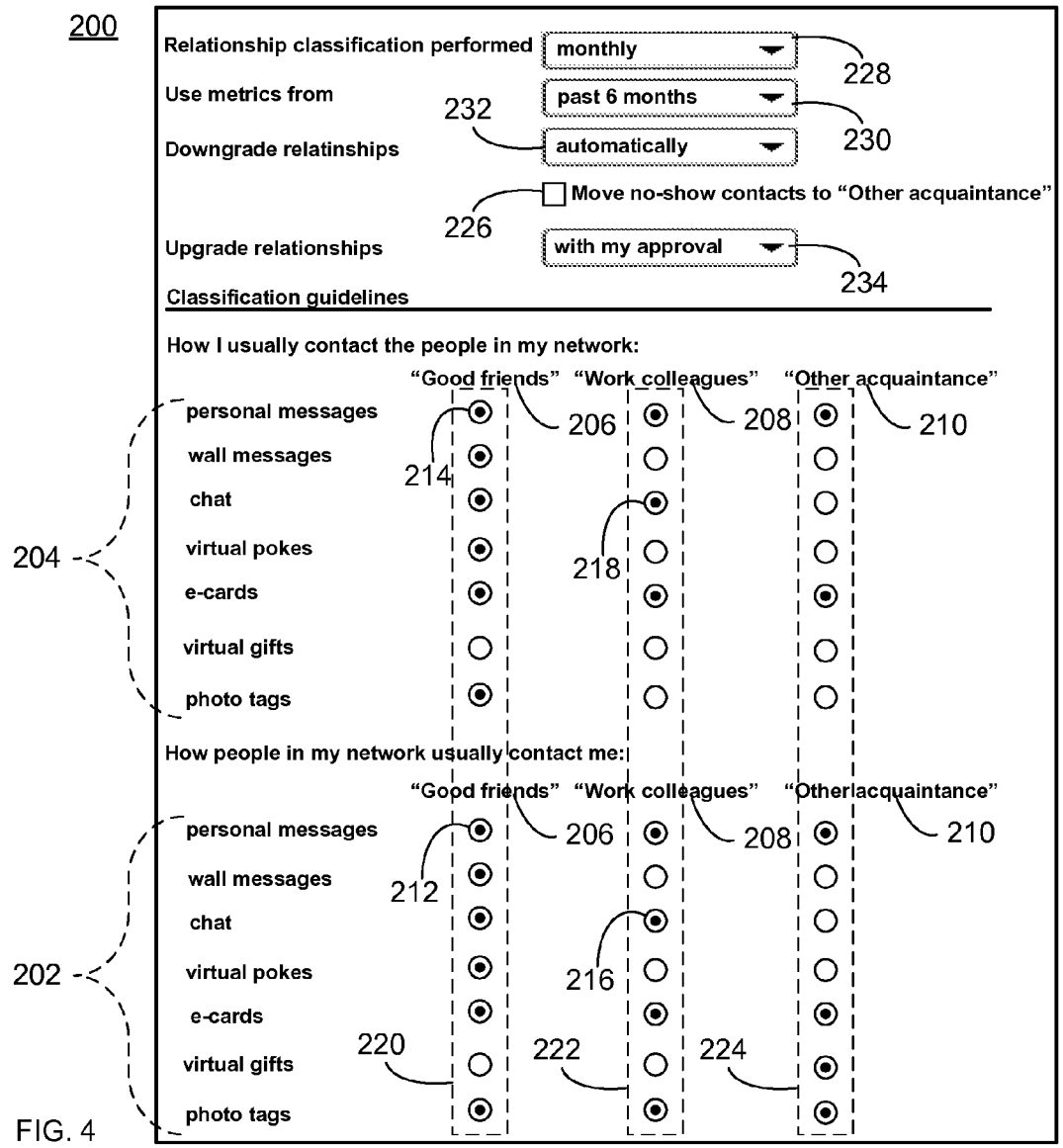
FIG. 4 is a graphical user interface associated with the relationship classification process.

As shown in FIG. 4, first contact group 206 and second contact group 208 may be groups created by a user in a social networking application. First contact group 206 may be, for example, a "good friends" contact group. The "good friends" contact group may include contacts which the user is close with. As such, the user may wish to allow contacts in the "good friends" contact group to view much of the personal information the user has on the social network. Second contact group 206 may be, for example, a "work colleagues" contact group. The "work colleagues" contact group may include contacts which the user is works with or otherwise has a professional relationship with. As such, the user may wish to allow contacts in the "work colleagues" contact group to view only some of the personal information the user has on the social network. While first contact group 206 and second contact group 208 will be discussed below for illustrative purposes, the user may create any number of contact groups. For example, the user may additionally create third contact group 210. Third contact group 310 may be, for example, an "other acquaintances" contact group. The "other acquaintances" contact group may include contacts the user does not know well. As such, the user may wish to allow contacts in the "other acquaintances" contact group to view little or none of the personal information the user has on the social network.

When associating 110 a first incoming communication type (e.g., incoming communication types 202) and a first outgoing communication (e.g., outgoing communication types 204) type with first contact group 206, and a second incoming communication type (e.g., incoming communication types 202) and a second outgoing communication type (e.g., outgoing communication types 204) with second contact group 208, a graphical user interface (GUI) may be used. For example, and as shown in FIG. 4, GUI 200 may include one or more user interface control elements including but not limited to check boxes (e.g., check box 226), combo boxes, drop-down lists (e.g., drop-down lists 228, 230, 232, 234), grid views, list boxes, radio buttons (e.g., radio buttons 212, 214, 216, 218), scrollbars, sliders, spinners, and, text boxes or any combination thereof. A user may, select personal messages radio button 212 under "good friends" contact group 206, if the user wishes to associate personal messages as an incoming communication type that contacts in "good friends" contact group 206 may send to the user. Further, a user may select personal messages radio button 214 under "good friends" contact group 206, if the user wishes to associate personal messages as an outgoing communication type that the user sends to those in "good friends" contact group 206.

Continuing with the above example, a user may select chat radio button 216 under "work colleagues" contact group 208, if the user wishes to associate chat as an incoming communication type that contacts in "work colleagues" contact group 208 send to the user. Further, a user may select chat radio button 218 under "work colleagues" contact group 208, if the user wishes to associate chat as an outgoing communication type that the user sends to those in "work colleagues" contact group 206. As shown in GUI 200, the user may associate a number of communication types with a number of contact groups based on how the user usually communicates with contacts, and how contacts usually communicate with the user, in each respective contact group. In other words, for a given contact group, the user may associate a number of communication types based on how the user perceives that he/she initially communicates and/or communicates with contacts, and how the user may perceive the contact initially communicates and/or communicates with the user. As such, the user may create a bidirectional model determined by the user to reflect the user's understanding of how to match his/her inbound/outbound communication mechanisms with a particular contact group.

Figure 5:
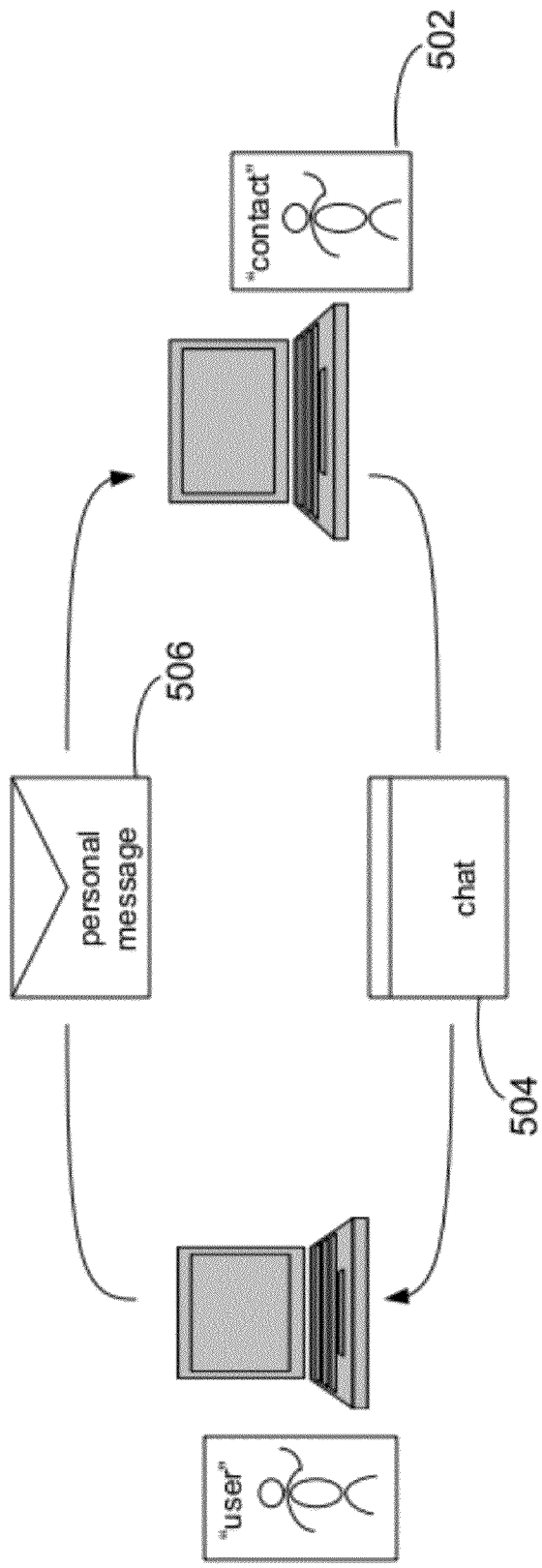
FIG. 5 is a diagrammatic view of communications associated with the relationship classification process.

Referring now to FIGS. 2 & 5, RC process 12 may monitor 112, via at least one of the client electronic device and the server computer, incoming communication 504 from contact 502 and outgoing communication 506 to contact 502. RC process 12 may monitor 112 incoming/outgoing communications after applying the user's bidirectional model and/or while applying the user's bidirectional model. Incoming communication 504 may be, for example, a chat communication type, and outgoing communication 506 may be, for example, a personal message communication type. Further, RC process 12 may designate 114, via at least one of the client electronic device and the server computer, incoming communication 504 as at least one of the first and second incoming communication types (e.g., incoming communication types 202) that the user may have associated 110 first contact group 206 and second contact group 208 with. Further, RC process 12 may designate 114 outgoing communication 506 as at least one of the first and second outgoing communication types (e.g., outgoing communication types 204) that the user may have associated 110 first contact group 206 and second contact group 208 with. As shown in FIG. 5 contact 502 may send a chat communication (e.g., incoming communication 504) to a user. The chat communication may be sent via a social network. As such, RC process 12 may designate 114 incoming communication 504 as a chat communication type. Further, the user may send a personal message communication (e.g., incoming communication 506) to contact 502. The personal message communication may be sent via a social network or email application. Similarly, RC process 12 may designate 114 outgoing communication 506 as a personal message communication type. RC process 12 may store a record of each incoming and outgoing communication and its respective communication type.

Further, RC process 12 may place 118, via at least one of the client electronic device and the server computer, contact 502 (i.e., "Jimmy") into at least one of first contact group 206 (i.e. "good friends") and second contact group 208 (i.e. "work colleagues") based upon, at least in part, the designated incoming communication type (e.g., incoming chat communication 504) and the designated outgoing communication type (e.g., outgoing personal message communication 506). For example, since contact 502 sent incoming chat communication 504 to the user, and since the user sent outgoing personal message communication 506 to the contact, the contact may be placed in either one of "good friends" contact group 206 and/or "work colleagues" contact group 208. This is because both "good friends" contact group 206 and "work colleagues" contact group 208 have personal message communication types and chat communication types associated with them, as shown in GUI 200. Further by way of example, if contact 502 sent the user a "wall message", contact 502 may be placed in "good friends" contact group 206 because it is the only contact group having wall message communication types associated therewith. While RC process 12 may find one contact group that is most appropriate for the contact, it may also place the contact into more than one contact group based on the incoming and outgoing communication types (i.e., bidirectional data). In some embodiments, RC process 12 may require 116 the user's permission before placing contact 502 into at least one of first contact group 206 and second contact group 208. For example, RC process 12 may render a pop-up window asking for the user's permission before automatically placing a contact into a contact group. Further, RC process 12 may require the user's permission before changing the contact group for a contact based on the incoming and outgoing communication types (i.e., bidirectional data).

A user may define 120 first contact group 206 and second contact group 208 in at least one of the social networking application and the email application. While GUI 200 shows contact groups "good friends", "work colleagues", and "other acquaintances", many other variations are possible. For example, the user may define any one of "relatives", "students", and/or "classmates" as contact groups in lieu of or in addition to the contact groups shown in GUI 200. In another embodiment, RC process 12 may define contact groups or come with predefined contact groups.

First contact group 206 (e.g., "good friends") may have first access permission scheme 220. Likewise, second contact group 208 (e.g., "work colleagues") may have second access permission scheme 222 and third contact group 210 (e.g., other acquaintances") may have third access permission scheme 224. Each access permission scheme may restrict contacts in the group having that access permission scheme from accessing different types of information on the user's social network. As shown in GUI 200, access permission schemes may be defined by the communication types (e.g., incoming communication types 202 and outgoing communication types 204) associated with each contact group (e.g., "good friends", "work colleagues", and "other acquaintances"). For example, since wall messages are only associated with "good friends", and not "work colleagues" or "other acquaintances", contacts in "good friends" contact group 206 may be permitted to see the user's wall messages, while contacts in work colleagues" contact group 208 and "other acquaintances" group 210 may not be permitted to see the user's wall messages.

While the access permission schemes are shown in GUI 200 as giving contacts in each contact group access to information of the communication types associated therewith, other variations are possible. Access permission schemes for each contact group may be entirely separate from the communication types associated with each contact group. For example, the user may set an access permission scheme such that only "good friends" are permitted to view the user's photos. The user may allow only "good friends" and/or "work colleagues" to view the user's personal information (i.e., full name, address, telephone number, email address, etc.). Access permission schemes which may be entirely different than the incoming and outgoing communication types associated with each contact group may be defined in a GUI other than GUI 200. In this way, the user may define 122 the first access permission scheme for first contact group 206, the second access permission scheme for second contact group 208, and the third access permission scheme for the third contact group 210. Alternatively, RC process 12 may define 122 the first access permission scheme for first contact group 206, the second access permission scheme for second contact group 208, and the third access permission scheme for the third contact group 210 automatically, or may come with predefined access permission schemes.

In one embodiment, RC process 12 may monitor 124 communication types of, at least one of, a plurality of outgoing communications (e.g., outgoing communication 506) to at least one contact (e.g., contact 502), and a plurality of incoming communications (e.g., incoming communication 504) from the at least one contact (e.g., contact 502). RC process 12 may further monitor 126 which contact group (e.g., "good friends" contact group 206) the user places the at least one contact (e.g., contact 502) into. RC process 12 may monitor incoming and outgoing communications over a configurable period of time.

In this way, RC process 12 may collect data and calculate on-going metrics about the ways in which the user communicates with contacts, and vice versa. For example, RC process 12 may find that whenever the user communicates with contacts in the "good friends" contact group, he usually sends wall messages, chat communications, or personal messages. Therefore, RC process 12 may infer that those communication types may be part of the usage model for the "good friend" contact group. As such, RC process 12 may extrapolate 128 a default model for the user based upon, at least in part, the communication types (e.g., incoming communication types 202 and outgoing communication types 204), and which contact group (e.g., "good friends" contact group 206) the user placed the at least one contact (e.g., contact 502) into. RC process 12 may place 130 a new contact into one of the contact groups (e.g., "good friends" contact group 206) based upon, at least in part, the default model.

Over time, RC process 12 may track subtle changes in relationships. For example, over time, RC process 12 may find that a contact currently classified as a "good friend" has stopped virtually poking the user and stopped sending wall messages to the user, and the user in turn has also stopped using these communication types with that contact. Suppose that the user sent an e-card and the contact photo-tagged the user. This change in communication may indicate that the relationship has changed to become less personal, and RC process 12 may re-classify this contact as an "other acquaintance", which may give this contact fewer access permissions. RC process 12 may gather such bidirectional communication data over a configurable period of time and may compile bi-directional statistics about communications to and from the user.

Figure 3:
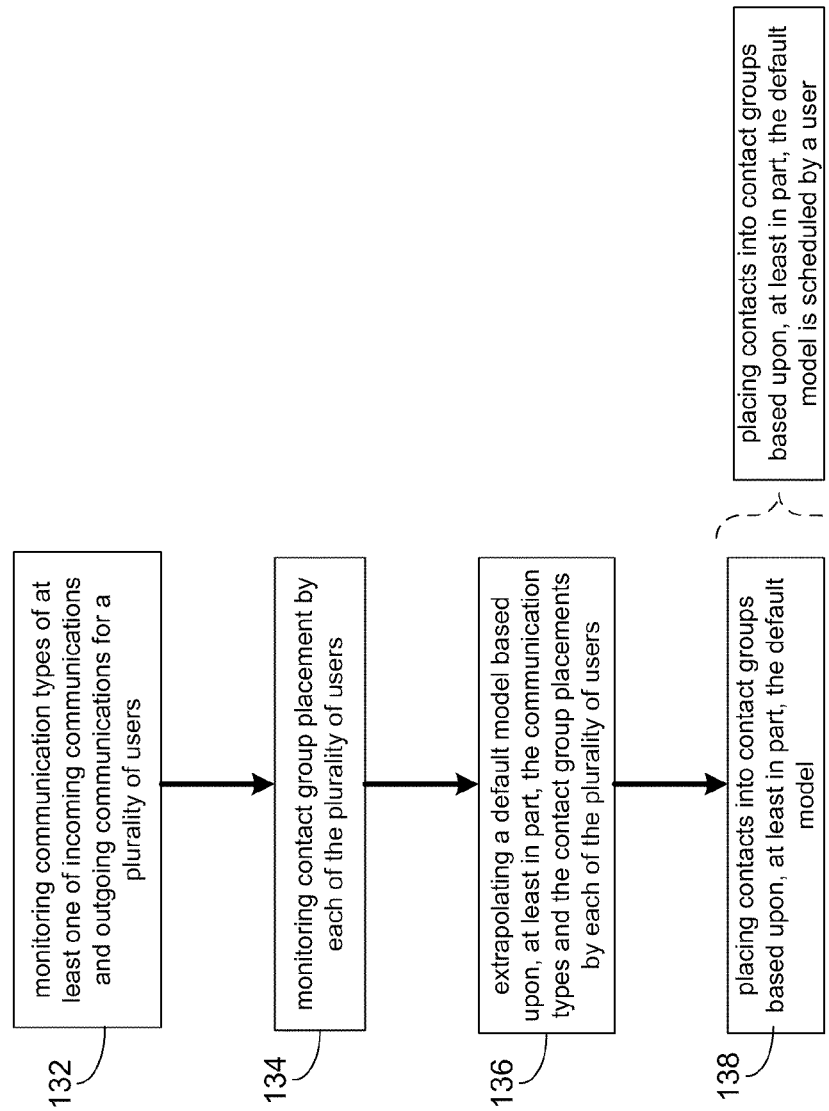
FIG. 3 is a continuation of the flowchart of FIG. 2.

Referring now to FIG. 3, RC process 12 may monitor 132 communication types of at least one of incoming communications (e.g., incoming communication 504) and outgoing communications (e.g., outgoing communication 506) for a plurality of users. RC process 12 may further monitor 134 contact group placement by each of the plurality of users. Additionally, RC process 12 may extrapolate 136 a default model for the user based upon, at least in part, the communication types (e.g., incoming communication types 202 and outgoing communication types 204) and the contact group placements by each of the plurality of users. RC process 12 may place 138 contacts (e.g., contact 502) into contact groups (e.g., "good friends" contact group 206) based upon, at least in part, the default model. Placing contacts (e.g., contact 502) into contact groups (e.g., "good friends" contact group 206) based upon, at least in part, the default model may be scheduled by a user. For example, the user may wish that all of his/her contacts in the social network be reclassified based upon the default model every 2 months, because the default model may change over time. In this way, RC process 12 may manage default relationship classifications based on expected communications norms for a population, or based on computed metrics from a representative sample of users. In another embodiment, a system administrator could suggest a default model on behalf of users based on location or other factors.

Using one or more of the features described above, RC process 12 may upgrade and downgrade contacts in the user's network. For example, the user may "virtually poke" only those in "good friends" contact group 206. If the user virtually pokes a contact not already in the user's "good friends" contact group, RC process 12 may interpret the virtual poking as a piece of evidence suggesting that the contact may need to be "upgraded" into the "good friends" group. Frequency can assist RC process 12 in upgrading or downgrading contacts, however, RC process 12 may not require frequency. For example, if the user virtually poked an existing "good friend" contact, that incident may provide evidence to RC process 12 that the contact continues to be a "good friend", even if the virtual poke was the only recent communication that has taken place with that contact. In some embodiments, greater weight can be given to the user's outgoing communication types than to the user's incoming communication types in determining what contact group to place the user in, or whether or not to move the user from one contact group to another (i.e., upgrade or downgrade the contact), and vice versa.

In another example, suppose the user is not likely to send a "virtual gift" communication. Also suppose the user's "good friends" are not likely to send virtual gifts to the user. In this situation, the user may only expect people who are not "good friends" to send virtual gifts. He may then associate the virtual gift communication type with the "other acquaintances" contact group. If the user receives a virtual gift, RC process 12 may use this as evidence that the sender of the virtual gift should be moved into the "other acquaintances" contact group.

It should be noted that RC process 12 provides separate contact group associations based on who initiates the social networking communication (i.e. the user or the contact). As such, RC process 12 may use bi-directional data in relationship classification. Based on bi-directional statistics collected and utilized to match a contact to the user's contact groups, RC process 12 may classify relationships. For example, tagging a person in a photo (i.e. photo tag communication type) may have different significance depending on whether the user tags the contact or whether contact tagged the user. For example, the user may be in a highly visible position and often may be photographed at corporate and public events. He/she may configure RC process 12 to associate contacts in all groups with photo tagging. On the other hand, the user may restrict access to photos he posts in his private area. The user may configure RC process 12 such that when the user tags someone in a photo, this will almost always indicate that the person being tagged is a "good friend".

While the discussion above discusses relationship classification in social networks, RC process 12 may also be used in an email application. For example, the user may have a mail folder to hold received mail from the user's college associates. RC process 12 may be configured to look for the name of the user's college in the inbound mail. Suppose some inbound mail is indeed from a college associate, but doesn't mention the name of the user's college. RC process 12 may associate the college associates mail folder with college football and basketball. RC process 12 may monitor the user's outbound mail for college football and basketball references. For example, if the user sends mail asking about basketball tickets RC process 12 may use this as evidence that mail recipients may be college associates. Over time, RC process 12 may classify subsequent miscellaneous inbound mail from these recipients (i.e., contacts) into the college associate folder, even if the inbound mail neither mentions the college, nor basketball/football. In this way, RC process 12 may use bi-directional data to classify relationships with email contacts.

Continuing with the above example, once inbound mail may be placed in the college associate folder, RC process 12 may monitor changes in the user's relationship with the recipients (i.e. contacts) whose mail is going to the college associate folder. Suppose the user associates references to trade show and conferences with professional associates. Over time, if the user begins sending emails to a college associate about trade shows and conferences, RC process 12 may place inbound mail from that recipient (i.e., contact) into the user's professional associate mail folder instead of, or in addition to, the college associate folder. In this way, RC process 12 may handle changing classifications over time by using bi-directional associations set by the user and by observing bi-directional communication behavior.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (i.e., a client electronic device), partly on the user's computer, as a stand-alone software package, partly on the user's computer and partly on a remote computer or entirely on the remote computer or server (i.e., a server computer). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Further, one or more blocks shown in the block diagrams and/or flowchart illustration may not be performed in some implementations or may not be required in some implementations. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:

1. A method comprising:
    associating, via at least one of a client electronic device and a server computer, a first incoming communication type and a first outgoing communication type with a first contact group, and a second incoming communication type and a second outgoing communication type with a second contact group, in at least one of a social networking application and an email application;
    monitoring, via at least one of the client electronic device and the server computer, an incoming communication from a contact and an outgoing communication to the contact;
    designating, via at least one of the client electronic device and the server computer, the incoming communication as at least one of the first incoming communication type and the second incoming communication type and the outgoing communication as at least one of the first outgoing communication type and the second outgoing communication type; and
    placing, via at least one of the client electronic device and the server computer, the contact into at least one of the first contact group and the second contact group based upon, at least in part, the designated incoming communication type and the designated outgoing communication type.

2. The method of claim 1 further comprising:
    defining the first contact group and the second contact group in at least one of the social networking application and the email application.

3. The method of claim 2 wherein the first contact group has a first access permission scheme, the second contact group has a second access permission scheme, and a third contact group has a third access permission scheme.

4. The method of claim 1 wherein the first incoming communication type, first outgoing communication type, second incoming communication type, and second outgoing communication type are at least one of a personal message, a wall message, a chat, a virtual poke, an e-card, a virtual gift, and a photo tag.

5. The method of claim 2 further comprising:
    defining the first access permission scheme for the first contact group, the second access permission scheme for the second contact group, and the third access permission scheme for the third contact group.

6. The method of claim 1 further comprising:
    requiring a user's permission before placing the contact into at least one of the first contact group and the second contact group.

7. The method of claim 1 further comprising:
    monitoring communication types of, at least one of, a plurality of outgoing communications to at least one contact, and a plurality of incoming communications from the at least one contact;
    monitoring which contact group a user places the at least one contact into;
    extrapolating a default model for the user based upon, at least in part, the communication types and which contact group the user placed the at least one contact into; and
    placing a new contact into one of the contact groups based upon, at least in part, the default model.

8. The method of claim 1 further comprising:
    monitoring communication types of at least one of incoming communications and outgoing communications for a plurality of users;
    monitoring contact group placement by each of the plurality of users;
    extrapolating a default model based upon, at least in part, the communication types and the contact group placements by each of the plurality of users; and
    placing contacts into contact groups based upon, at least in part, the default model.

9. The method of claim 1 wherein placing the contact into at least one of the first contact group and the second contact group is scheduled by a user.

10. The method of claim 8 wherein placing contacts into contact groups based upon, at least in part, the default model is scheduled by a user.

11. A computer program product residing on a non-transitory computer readable storage medium having a plurality of instructions stored thereon, which, when executed by a processor, cause the processor to perform operations comprising:
    associating, via at least one of a client electronic device and a server computer, a first incoming communication type and a first outgoing communication type with a first contact group, and a second incoming communication type and a second outgoing communication type with a second contact group, in at least one of a social networking application and an email application;
    monitoring, via at least one of the client electronic device and the server computer, an incoming communication from a contact and an outgoing communication to the contact;
    designating, via at least one of the client electronic device and the server computer, the incoming communication as at least one of the first incoming communication type and the second incoming communication type and the outgoing communication as at least one of the first outgoing communication type and the second outgoing communication type; and
    placing, via at least one of the client electronic device and the server computer, the contact into at least one of the first contact group and the second contact group based upon, at least in part, the designated incoming communication type and the designated outgoing communication type.

12. The computer program product of claim 11 further comprising instructions for:
    defining the first contact group and the second contact group in at least one of the social networking application and the email application.

13. The computer program product of claim 12 wherein the first contact group has a first access permission scheme, the second contact group has a second access permission scheme, and a third contact group has a third access permission scheme.

14. The computer program product of claim 11 wherein the first incoming communication type, first outgoing communication type, second incoming communication type, and second outgoing communication type are at least one of a personal message, a wall message, a chat, a virtual poke, an e-card, a virtual gift, and a photo tag.

15. The computer program product of claim 12 further comprising instructions for:
   defining the first access permission scheme for the first contact group, the second access permission scheme for the second contact group, and the third access permission scheme for the third contact group.

16. The computer program product of claim 11 further comprising instructions for:
   requiring a user's permission before placing the contact into at least one of the first contact group and the second contact group.

17. The computer program product of claim 11 further comprising instructions for:
   monitoring communication types of, at least one of, a plurality of outgoing communications to at least one contact, and a plurality of incoming communications from the at least one contact;
   monitoring which contact group a user places the at least one contact into;
   extrapolating a default model for the user based upon, at least in part, the communication types and which contact group the user placed the at least one contact into; and
   placing a new contact into one of the contact groups based upon, at least in part, the default model.

18. The computer program product of claim 11 further comprising instructions for:
   monitoring communication types of at least one of incoming communications and outgoing communications for a plurality of users;
   monitoring contact group placement by each of the plurality of users;
   extrapolating a default model based upon, at least in part, the communication types and the contact group placements by each of the plurality of users; and
   placing contacts into contact groups based upon, at least in part, the default model.

19. The computer program product of claim 11 further wherein placing the contact into at least one of the first contact group and the second contact group is scheduled by a user.

20. The computer program product of claim 18 wherein placing contacts into contact groups based upon, at least in part, the default model is scheduled by a user.

* * * * *